US012723142B2

(12) United States Patent
Chen et al.

(10) Patent No.: US 12,723,142 B2
(45) Date of Patent: Sep. 1, 2026

(54) LOW-DIELECTRIC AND LOW-THERMALCONDUCTIVITY AEROGEL COMPOSITES AND PREPARATION METHOD THEREOF

(71) Applicant: Taiwan Aerogel Technology Material Co., Ltd., Tainan City (TW)

(72) Inventors: Jean Hong Chen, Tainan City (TW); Shiu Shiu Chen, Tainan City (TW); Cheng Shu Chiang, Tainan City (TW); Chi Hung Lo, Tainan City (TW)

(73) Assignee: Taiwan Aerogel Technology Material Co., Ltd., Tainan City (TW)

( * ) Notice: Subject to any disclaimer, the term of this patent is extended or adjusted under 35 U.S.C. 154(b) by 767 days.

(21) Appl. No.: 18/084,594

(22) Filed: Dec. 20, 2022

(65) Prior Publication Data

US 2024/0199835 A1 Jun. 20, 2024

(51) Int. Cl.

| | |
|---|---|
| ***C08J 9/28*** | (2006.01) |
| ***C08J 3/07*** | (2006.01) |
| ***C08J 5/04*** | (2006.01) |
| ***C08J 9/228*** | (2006.01) |

(52) U.S. Cl.

CPC . *C08J 9/28* (2013.01); *C08J 3/07* (2013.01); *C08J 5/04* (2013.01); *C08J 9/228* (2013.01); *C08J 2201/0504* (2013.01); *C08J 2205/026* (2013.01); *C08J 2383/04* (2013.01)

(58) Field of Classification Search

CPC ......... C08J 9/28; C08J 3/07; C08J 5/04; C08J 9/228; C08J 2201/0504; C08J 2205/026; C08J 2383/04

See application file for complete search history.

(56) References Cited

U.S. PATENT DOCUMENTS

2020/0171455 A1* 6/2020 Chen ...................... B01J 13/185
2025/0002410 A1* 1/2025 Zafiropoulos ......... C04B 35/495

* cited by examiner

*Primary Examiner* — Shane Fang

(74) *Attorney, Agent, or Firm* — Troutman Pepper Locke LLP; Tim Tingkang Xia, Esq.

(57) ABSTRACT

The aerogel molecules mixed with aqueous solution containing a trace amount of alcohols solvent is dispersed by mixer to form an aerogel suspension dispersion solution containing a trace amount of alcohols, which can be uniformly aerogel/fiber blankets composites with mixed various types of fibrous blankets or fibrous mats, and then drying and solvent recovery to form a low-cost, low-medium electrical aerogel/fiber insulation blanket, the steps of which comprises mixed hydrolysis, suspension dispersion condensation solution, immersion composite molding, and drying and solvent recovery. This technology does not add a large amount of hydrophobic organic solvents and surfactants, and in the suspension dispersion condensation using a large amount of aqueous solution, that contained a trace amount of alcohols solvent, combined with emulsifier for suspension dispersion the hydrophobic or hydrophilic-hydrophobic complex aerogel dispersion solution, that combine aerogel dispersion solution with various types of fibrous blankets or fibrous mats by dipping and spraying, moreover, the aerogel composites drying and solvent recycling through atmospheric pressure drying technology.

20 Claims, 10 Drawing Sheets

LOW-DIELECTRIC AND LOW-THERMALCONDUCTIVITY AEROGEL COMPOSITES AND PREPARATION METHOD THEREOF

FIELD OF THE INVENTION

The present invention relates to a preparation technology for preparing low-cost, low-dielectric, and low-heat transfer coefficient hydrophobic or hydrophilic-hydrophobic complex aerogel composites. This technology does not add hydrophobic organic solvents and various additives in the hydrolysis and condensation steps of the preparation process, and directly suspends and disperses the aerogel condensation and dispersion solution at a high speed in the environment of a large amount of hydrophilic solutions containing alcohols so as to form aerogels suspension dispersion colloidal solution. In this preparation technology compared to the traditional aerogel sol-gel reaction technology that reduces using a large amount of hydrophobic organic solvents (such as n-hexane, cyclohexane, benzene, toluene, and xylene), acid and base catalysts for hydrolysis and condensation reactions, respectively, is significantly reduces the impurities within aerogels. Moreover, this preparation technology also does not use the surfactants, ammonia and other additives in sol-gel reaction. Therefore, this preparation technology can prepare a low-cost, a low-impurity, and a low-dielectric low-thermal conductivity hydrophobic or hydrophilic-hydrophobic complex aerogel composites.

BACKGROUND OF THE INVENTION

It is well known that the thermal conductivity and dielectric properties of materials gradually decrease with the increasing of the internal porosity of the material. Therefore, aerogel materials and related aerogel composite materials can become the energy-saving and carbon-reducing products with low thermal conductivity required by the high-temperature process industry. In addition, it can also be used as 5G and 6G high-frequencies signal transmission and electric vehicle lithium battery safety protection products. As we all know, silica aerogel is a porous material with a three-dimensional network microstructure of silica molecules. When its porosity is higher than 80% (even higher than 95%), the aerogel material has a low density (about 0.005 to 0.2 g/cm$^3$), high specific surface area (500 to 2,000 m$^2$/g), low thermal conductivity (k=15 to 40 mW/mk), low dielectric properties (Dk=1.3 to 2.5) and low dielectric loss (Df<0.003 or less) technology products. Due to the above excellent properties of aerogel materials, it can be used in industrial applications such as high temperature heat insulation, low temperature insulation, electromagnetic-wave absorption, and low dielectric properties. Since the size of the pores inside the porous aerogel is only a few nanometers to tens of nanometers, the aerogel has low thermal conductivity and thermal convection properties. Therefore, the higher the porosity in the microstructure of inorganic aerogels or organic aerogels induces the lower the thermal conductivity and dielectric properties of the materials. Therefore, in the future, such as petrochemical pipelines, metal smelting, building fire protection, thermal insulation, 5G low dielectric, and high-frequency signal transmission for electric vehicles will all need to use porous aerogels as the first choice for industrial applications. However, it needs to use a large amount of alcohols, ammonia and hydrophobic solvents (such as n-hexane, cyclohexane, benzene, toluene, and xylene) in the aerogel process for traditional sol-gel reaction and a large amount of hydrophobic solvent for solvent-replacement, and needs to use the surfactants to prevent significant shrinkage and cracking during aerogel manufacturing. Therefore, in aerogel manufacturing, a large amount of organic solvents and surfactants added in the process have greatly increased the overall cost of aerogel manufacturing and evidently decreased the physical properties of aerogel in subsequent applications; such as cracking and odor in high temperature environments. Moreover, the product containing a lot of impurities and ions will also affect the dielectric properties of the aerogel.

The traditional preparation method of aerogel is sol-gel reaction, which is mainly made by mixing the alkoxysilane, methyl orthosilicate or water glass and other precursors with organic solvents first, and then an acid catalyst is added to carry out a hydrolysis reaction. After the hydrolysis reaction is carried out for a certain period of time, an alkali catalyst is added to take place the condensation reaction. During the condensation reaction, a sol will gradually be formed, and the molecules in the sol will continue to react and bond so as to gradually form a semi-solid wet gel. After a period of aging, the gel forms a stable three-dimensional network microstructure of silica molecules. Finally, n-butanol, n-hexanol, n-hexane, cyclohexane or other solvents can be used for solvent-replacement of the wet gel, and then supercritical drying technology is used to extract and dry the solvent of the aerogel system. Using the preparation method with this process technology not only consumes a large amount of expensive organic solvents and supercritical drying equipment, but also requires long-term solvent-replacement with hydrophobic solvents; such as alkanes etc. Therefore, the traditional preparation method of aerogels is expensive and wastes process time.

Therefore, in the current preparation method of hydrophobic aerogel, a methyl alkoxysilane precursors such as methyltrimethoxysilane (MTMS) or methyltriethoxysilane (MTES) is mixed with an organic solvent, and then an alkali catalyst is added to take place the hydrolysis reaction. The condensation reaction is carried out after the hydrolysis reaction for a certain period of time, and a sol is gradually formed during the condensation reaction. The molecules of silica in the sol continue to react and bond each other so as to form a semi-solid gel gradually. After a period of aged time, the organic solvent such as isopropanol, acetone, n-hexane or cyclohexane is used for solvent-replacement for two to three days, so that the hydrophobic gel forms a structurally stable three-dimensional network microstructure. Finally, the solvent of the aerogel system is dried by atmospheric drying technology to obtain a porous, hydrophobic and dry aerogel block or composite material. However, traditional aerogel preparation technology needs to use a large amount of alcohols, such as ethanol, n-butanol, n-hexanol, isopropanol, and a large amount of hydrophobic organic solvents, such as cyclohexane, n-hexane, cyclohexane or toluene for performing reaction or solvent displacement, and the aerogel porosity increases with the increase of the relevant content of alcohols and organic solvent. In addition, drying aerogel composites with supercritical or subcritical drying equipment will lead to the disadvantages of complicated equipment procedures and expensive equipment investment.

"The heat insulation member and heating element" described in the Chinese Invention Publication No. CN 113873697A and the Republic of China Invention Publication No. 1750717 provide a heat insulation member and a heating element. The heat insulation member comprises a heat insulation material and a first covering heat insulation material, and the first covering layer is sewn along a first sewing position to seal the heat insulation material. The heat insulation material can prevent the dust generated from the heat insulation material from scattering. At the same time, the heating element comprising the above-mentioned heat insulation member is also provided. However, due to the extremely small particle size of aerogel dust, it is coated with one covering layer selected from the group consisting of silica gel, copper alkane lubricating oil, non-soap-based synthetic lubricating oil, lithium-based pressure-resistant grease, silicone-based grease and molybdenum disulfide butter. The use of sewing thread sewing covering layer can reduce the escape of the aerogel dust, but it still cannot effectively and completely suppress the leakage of the aerogel dust ranging in size from sub-micron to below sub-micron, which causes internal pollution of the clean room.

"The flexible composite aerogel and its manufacturing method" described in the Republic of China Invention Publication No. TW 201542457 mainly relates to a direct dispersion preparation method of a hydrophilic aerogel. The method of the present invention relates to a flexible composite organic aerogel comprising a textile reinforcement in which an organic aerogel is placed. The organic aerogel is based on a resin at least partly derived from polyhydroxybenzene and formaldehyde, which is a polymeric organogel containing at least one water-soluble cationic polyelectrolyte, or the thermal decomposition product of the gel in the form of the organic aerogel porous carbon monolith, which comprises the pyrolysis product of the at least one water-soluble cationic polyelectrolyte.

"The aerogel composites and the method for preparing the same" described in the Republic of China Invention Publication No. TW 1655094 mainly relates to aerogel composites. The aerogel composites include at least one base layer having an upper surface and a lower surface, and the base layer includes a reinforcing aerogel composition which includes a reinforcing material and a monolithic aerogel frame; a first cover layer includes a first cover material adhered to the upper surface of the base layer; and a second cover layer includes a second cover material adhered to the lower surface of the base layer. At least a portion of the monolithic aerogel frame of the base layer extends into a portion of both the first cover layer and the second cover layer. The first cover material and the second cover material may each consist essentially of elastic fibers such as spandex, nylon, lycra, spring fibers, or combinations thereof, or consists mainly of elastic fibers. However, the prepared aerogel covering material contains elastic fibers or soft polymer sheets, and the used adhesive materials are also organic adhesives such as acrylate, urethane, and hot melt adhesive. Although related soft products have good encapsulation properties for aerogels.

"The aerogel composites and its preparation method" described in the Republic of China Invention Publication No. TW 1663062 comprises: wetting at least one of inorganic fibers and organic fibers to form a fibrous material; laminating the wetted fibrous material and a spacer in a roll-up configuration or a planar form; filling the fibrous material into a container; injecting a precursor into the container and gelling the precursor at the same time to remove residual air bubbles under vacuum so as to prepare a gel-fiber composite; taking the aerogel-fiber composite from the container and removing the spacer; utilizing solvent substitution and organic surface modification to deal with the gel-fiber composite, and then drying the organic surface-modified gel-fiber composite by atmospheric pressure drying or supercritical drying.

"The laminated body comprising the reinforced aerogel composites" described in the Republic of China Invention Publication No. TW 1743082 relates to an aerogel composites material. The aerogel composites include at least one base layer having a top surface and a bottom surface, and the base layer includes a reinforced aerogel composition and a monolithic reinforced aerogel frame. The reinforced aerogel composition includes a reinforcing material, a first facing layer comprising a first facing material attached to the top surface of the base layer, and a second facing layer comprising a second facing material attached to the bottom surface of the base layer. At least a portion of the monolithic aerogel frame of the base layer extends to at least a portion of both the first and second facing layers. The first facing material and the second facing material each consist essentially of the fluoropolymer materials.

"The Manufacturing Method of Aerogel Felt" described in the Republic of China Invention Publication No. TW 1765609 relates to a manufacturing method of aerogel felt, which firstly injects aerogel slurry into a glass fiber felt. Then, the soaking liquid is used to form a closed coating layer on the surface of the glass fiber felt to avoid the phenomenon of powder falling off during the storage, transportation and use of the aerogel felt. Therefore, it can be ensured that the amount of aerogel in the aerogel felt does not decrease, thereby not affecting the thermal insulation performance of the aerogel felt, wherein the closed coating layer is selected from acrylic emulsion, talc, VAE emulsion and water-based curing agent mixture.

"The non-woven/aerogel composite fireproof/insulation material and its preparation method" described in the Republic of China Invention Publication No. TW 1535658 invented by our team is disclosed to prepare an aerogel through a hydrolysis step and a condensation step. And then in the forming step, the aerogel is taken and added to a non-woven fabric so that the aerogel is fully interspersed in the non-woven fabric. And a drying process is performed to form a non-woven/aerogel composite fireproof/thermal insulation material through making the aerogel fully interpenetrate in the non-woven fabric by impregnation processing or continuous rolling. The conditions of this drying process are drying anhydrous aerogels at normal temperature and pressure or using the organic solution between 30 □ and 80 □ for rapid vaporization and drying.

"Manufacturing Electronic Devices Using Low-K Dielectric Materials" described in the US Invention Patent Publication No. U.S. Pat. No. 8,945,677B2 mainly uses low-dielectric materials (including polyimide aerogels) as manufacture materials and methods for making electronic devices and semiconductor components. This previous patent also provides methods for manipulating dielectric material properties and affecting the overall dielectric properties of a system. Specifically, a polyurethane pre-sol, a catalyst and a polar solvent are mixed to form a sol mixture layer, and then the sol components are cross-linked to form a wet gel material. The solvent contained in the wet gel material is removed by supercritical fluid to form a polyimide aerogel film. This technique was used to combine a surface of non-porous, low-k template substrate with a polyimide aerogel film. The low-K dielectric materials are used to manufacture electronic devices in the prior art and the supercritical fluid technology is used for multiple steps of solvent removal by pressure cycling. The overall technology is time-consuming and costly, and the manufacturing process takes too long, which is not cost-effective.

"The Low-K Dielectric Layer Structure, Semiconductor Device Structure and Forming Method" described in the Chinese Invention Patent Publication No. CN102044525A mainly uses silica aerogel to form a low-K dielectric layer structure. The prior art of this patent also provides a semiconductor device structure and a method for forming the same, wherein the forming method comprises: providing a substrate, on which a first dielectric layer and an etching barrier layer are formed, and the openings are formed in both the first dielectric layer and the etching barrier layer and filled with metal as a plug; forming a sacrificial oxide layer on the etching barrier layer and the plug; forming an opening in the sacrificial oxide layer, and filling metal in the opening to form an interconnection structure, wherein the interconnection structure is electrically connected to the plug; selectively removing the sacrificial oxide layer to form voids between the interconnection structures; forming silica aerogel in the voids between the interconnect structures as a low-K dielectric layer. The prior art of this patent uses a low-K dielectric layer structure and tetraethyl orthosilicate (TEOS) or tetramethyl orthosilicate (TMOS) are used as the material for the structure. In addition, the drying method uses room temperature or supercritical fluid technology to prepare low-dielectric thin films in multiple steps. The overall technology is time-consuming and expensive, and the process takes too long, which is not cost-effective.

"The Aerogel Insulation Panel and Its Manufacturing" described in the Chinese Invention Patent Publication No. CN105189104A mainly uses polyimide aerogel to prepare an insulation panel, which can be applied to laminated panels for aerospace applications. The panel includes a polyimide aerogel surface layer and a reflective protective layer on the surface layer. The manufacturing process of the polyimide aerogel in the previous patent includes: (a) forming a polyimide solution by polymerizing a mixture of dianhydride and diamine monomers in a bipolar alkaline solvent (DMAc or NMP); (b)) casting the polyamide solution into the fibrous flock; (c) using acetic anhydride and pyridine gel polyamide solution by chemical imidization reaction; (d) using supercritical or sub-supercritical $CO_2$ drying technology to transfer solvent removal from gels to form fiber/polyimide aerogel composites.

The "aerogel/polymer composite material" of US Patent Publication No. U.S. Pat. No. 9,777,126B2 includes aerogel and thermoplastic polymer material, and the weight ratio of aerogel to thermoplastic polymer is less than 20:100. The composite material has excellent insulation properties and better softness and lower brittleness in low temperature environment.

The "Method for Preparing Cross-Linked Polyimide Aerogel" in the Chinese Invention Patent Publication No. CN108203516A mainly adopts the sol-gel method, which includes: (a) forming a polyimide solution by polymerizing a mixture of dianhydride and diamine monomers in a bipolar alkaline solvent (DMAc or NMP); (b)casting the polyamide solution into the fibrous flock; (c) using acetic anhydride and pyridine gel polyamide solution by chemical imidization reaction; (d) using supercritical or sub-supercritical CO2 drying technology to remove solvent from gels to form fiber/polyimide aerogel composites.

"The Preparation Method of Aerogel/Composite Non-woven Fireproof and Insulation Material" described in the ROC Invention Publication No. TW I643888 by our team goes through a mixing step, a hydrolysis step and a condensation step to form a condensation solution containing a ungelatinized silica gel-silicon aerogel-silane coupling agent aerogel solution. Then in the forming step, the condensation solution of the ungelatinized silica gel-silicon aerogel-silane coupling agent aerogel solution is absorbed into a recycled composite non-woven blanket or a general non-woven blankets by impregnation, spray painting, spraying, or continuous pressure suction of the solution so that the silica gel-silicon aerogel-silane coupling agent aerogel is gelled and interspersed in the non-woven blanket. And a drying process is subjected to form an aerogel/composite non-woven fireproof and thermal insulation material, wherein the drying condition of the process is to carry out aerogel drying at normal temperature and pressure, or to carry out the rapid vaporization and drying process of organic solution between 30 □ and 80 □. The non-woven fabric selected from polyethylene (PE), polypropylene (PP), polyester, polyamine, glass fiber, rock wool or one of them or their combination is made into an aerogel composites that does not lose dust.

Due to the traditional sol-gel technology for making porous aerogels, a large amount of organic solvent needs to be added in the hydrolysis reaction and condensation reaction of the sol-gel reaction; such as adding a large amount of alcohol, water, hydrophobic n-hexane or cyclohexane, or even adding solvents such as toluene or benzene to reduce the shrinkage or cracking of aerogel molecules during the drying process; in addition, acid ions and base ions are also added to act as catalysts during hydrolysis and condensation process, and so do the ROC Invention Publication No. I705096 which a large amount of surfactants or other additives are used in. Therefore, a long-term solvent replacement or a long-term cleaning with deionized water is required in the latter part of the process to prepare an appropriate aerogel product or to maintain the stability of the aerogel structure during the drying process. In addition, the use of supercritical or sub-supercritical $CO_2$ drying technology to remove the solvent in the gel can effectively prepare aerogel materials with excellent quality, but the above related technologies have their advantages and disadvantages.

The biggest disadvantage of the above process is the use of a large amount of expensive organic solvents, such as hydrophobic n-hexane, cyclohexane, toluene or benzene and other toxic solvents, as well as a large amount of alcohols and ammonia, that will cause environmental and safety hazards. Moreover, in the preparation technology of traditional silica aerogels were used solvent replacement for multiple steps at room temperature. In the solvent replacement, a large amount of organic solvents, such as isopropanol, n-butanol, n-hexane, cyclohexane, toluene or benzene, are also used for solvent replacement technology. Related technologies are all in the drying process to reduce the interfacial tension of water molecules inside the aerogel to induce a remarkable shrinkage and cracking of the aerogel. In addition, the time required for such solvent replacement is also more than 48 to 72 hours, and the time required for solvent replacement is too long, so the preparation cost of aerogel is significantly increased. Therefore, the recovery and purification of various organic solvents used in the process is difficult. The process is complicated and dangerous, and the process time is lengthy and not cost-effective.

Based on the shortcomings of the above-mentioned thermal insulation or low-dielectric aerogel patents, the main disadvantage of the aerogel manufacturing technology is the use of a large amount of hydrophobic organic solvents and additives such as surfactants in the manufacture of aerogels. In addition, the direct preparation method is mainly used in the combination technology of aerogel and fiber material, such as a soaking method using different aerogel slurries, a bonding method using organic glue materials, and a co-mixing method using soft silica gel disclosed by our team's previous technology. When the above traditional aerogel composites are used in a high temperature environment, the related organic adhesive materials will be thermally cracked in a high temperature environment. The aerogel powders inside the cracked aerogel composites will start to fall, which will lead a rapidly decline in the high-temperature thermal insulation performance of aerogel materials. Especially when the temperature is above 250° C. for a long time, the organic aerogels (polyimide aerogels), organic modifiers or organic adhesives used in the above invention patents will gradually crack at a high temperature of 250° C. for a long time. A large amount of toxic gas is generated, which is another obvious disadvantage of aerogel composites in high temperature environment applications.

In view of the above-mentioned deficiencies of the prior art, the present inventors have the idea of improvement, and then make in-depth research and creation. The main purpose of the present invention is to provide a method for producing the aerogel composites with low cost, high purity (low dielectric), and low thermal conductivity.

SUMMARY OF THE INVENTION

One object of the present invention is to improve the above-mentioned shortcomings in the production technology of hydrophobic or hydrophilic-hydrophobic complex aerogel composites. For example, a large amount of hydrophobic organic solvent needs to be added in the traditional hydrophobic aerogel blanket, and the manufacturing cost affected by the organic solvent content will be increased. Therefore, the addition of organic solvents, surfactants, and organic adhesives in the process can be effectively reduced, which can significantly reduce manufacturing costs, reduce process risks, and improve product purity to increase applicability.

Another object of the present invention is to improve the above-mentioned shortcomings in the recovery of organic solvents in the production of hydrophobic or hydrophilic-hydrophobic complex aerogel composites. For example, a mixture of various solvents is used in the traditional hydrophobic aerogel production process to make these organic solvent mixtures be recovered, distilled, purified and then reused, which also requires a lot of energy and equipment construction costs, and distillation and separation of various organic solvents also have azeotropes between various solvents. Therefore, it is also quite difficult to effectively purify the organic solvent to effectively reduce the use cost of the organic solvent in the process. In this technology, the alcohols, mainly methanol and ethanol, produced in the hydrolysis or condensation reaction are used to become the alcohols recovered by the process. These recovered alcohols aqueous solutions and recovered distilled water can be recycled and reused. These recovered alcohols aqueous solutions have no other hydrophobic solvents in the purification technology, so the recovery technology is relatively simple, which can significantly reduce the investment in solvent recovery equipment and recovery costs.

Another object of the present invention is to improve the above-mentioned shortcomings in the application of related hydrophobic or hydrophilic-hydrophobic complex aerogel composites. For example, due to the addition of surfactants or emulsifiers to aerogel composites preparation in traditional hydrophobic aerogel materials, a large amount of surfactant or emulsifier is accumulated in the aerogel composites, which will obviously affect the hydrophobic properties, thermal insulation properties and dielectric properties of the aerogel. And related products will produce severe thermal cracking of organic matter in a high temperature environment (about 200 □) and produce a large amount of toxic substances and odors. The developed product has the disadvantage that the application temperature range is obviously limited.

Another object of the present invention is to develop and improve the sol-gel synthesis technology combined with the suspension and dispersion technology to prepare hydrophobic or hydrophilic-hydrophobic complex aerogel composites products without adding a large amount of dispersing organic solvents and surfactants. Therefore, an emulsifier or a homogenizer is used to suspend and disperse the hydrophobic aerogel wet glue molecules in a large amount of aqueous solution, and the particle size and porosity of the hydrophobic or hydrophilic-hydrophobic complex aerogel can be easily controlled by the above-mentioned technology, whereby a continuous or batch mass production of hydrophobic or hydrophilic-hydrophobic complex aerogel composites with low cost, high purity, and low thermal conductivity is performed.

Another object of the present invention is to improve the long-term solvent replacement in the traditional hydrophobic aerogel composites manufacturing process, and aerogel composites with low cost, high purity, and low thermal conductivity can be mass-produced without using expensive supercritical drying technology.

Therefore, in order to improve the shortcomings of using a large amount of organic solvents in the preparation process of aerogel composites products in the past and the high temperature cracking of organic compounds in the product application process, firstly the co-solvent hydrolyzed solution is suspended, dispersed and condensed under the condition of a large amount of dispersion water with alcohols and composited in the preformed fibrous blanket or any substrate in the preparation process of the aerogel composites of this technology. Then after gelation molding, the alcohol-containing aqueous solution is azeotropical vaporized and dried in a normal pressure and high temperature environment, and the recyclable alcohol-containing azeotropic solution is recycled and reused or the relevant alcohols is recycled as by-products during vaporization and drying. And then the trace amount of solvent in the product is quickly dried and vaporized in a higher temperature environment. On the one hand the low-cost, high-purity, and low thermal conductivity aerogel composites can be prepared, and on the other hand the valuable by-products can be recovered. The hydrophobic aerogel/inorganic fiber products developed by this technology can be applied to the aerogel composites that are energy-saving, carbon-reducing and energy-saving for thermal insulation, such as high-temperature pipelines above 800 □, high-temperature boilers and smelting boilers, or applied to industries such as 5G low dielectric, high-frequency signal transmission for electric vehicles, and lithium battery safety protection.

A method for preparing a low-dielectric and low-thermal conductivity aerogel/fiber composites comprises: (1) a mixed hydrolysis step: adding a siloxane precursor to an aqueous solution containing a trace amount of alcohols, and stirring and mixing the aqueous solution to form a mixed solution, wherein the siloxane precursor comprises a siloxane compound (such as TEOS and TEMS) and a hydrophobically modified siloxane compound (such as MTMS and MTES) or a combination thereof, and then an acid catalyst solution is added to the mixed solution for hydrolysis reaction; (2) a suspension dispersion condensation solution step: adding a large amount of dispersion aqueous solution containing a trace amount of alcohols into the hydrolyzed solution in combination with dispersing equipment such as emulsifiers and homogenizers for rapid dispersion, so that the hydrolyzed solution is dispersed in the aqueous solution for condensation reaction, wherein the suspension dispersion condensation soliquoid includes an alkali catalyst for catalyzing the condensation reaction to accelerate the formation of the gel gradually in the suspension dispersion solution; (3) a composite molding step: performing a pressure suction, impregnation or spray technology for the suspension dispersion condensation solution so as to promote the suspension dispersion condensation solution rapidly injected into a fibrous substrate so that the suspension dispersion sol solution inside the fibrous substrate further is condensed to form a three-dimensional network microstructure of aerogel wet glue fiber composite structure; (4) a drying and solvent recovery step: keeping the aerogel wet glue fiber composite structure at a molding and drying temperature under normal pressure to vaporize the solvent inside the aerogel composites, recovering the vaporized vapor by condensing through a heat exchange device, and making the aerogel/fiber composites expand during drying to obtain an aerogel/fiber composites with uniform structure and both low heat transfer and low dielectric properties, wherein the low-cost, high-purity, and low thermal conductivity aerogel composites can be obtained from the above process technology, and the combined product will have both low thermal conductivity and low dielectric properties for industrial applications.

Further, in the above preparation method, the siloxane compound comprises tetramethoxysilane (TMOS), tetraethoxysilane (TEOS) or a combination thereof; the hydrophobic modified siloxane compound comprises methyltrimethoxysilane (MTMS), methyltriethoxysilane (MTES) or a combination thereof; wherein in the overall mixed solution, the molar ratio of the content of the siloxane compound and the hydrophobic modified siloxane compound is between 0:100 mol % and 85:15 mol %; the purpose of adding the hydrophobic modified siloxane compound is to reduce the cracking phenomenon of the aerogel structure during the drying process; on the other hand, the purpose of adding the siloxane compound is to provide regulation of the internal microstructure of the aerogel structure and increase the pore structure and porosity in the structure to reduce thermal conductivity or improve thermal insulation.

Further, in the mixed hydrolysis step (1), the higher content ratio of the acid catalyst in the mixed solution induces the faster hydrolysis rate, but a large amount of acid ions will produce ionic conductivity under the action of an electric field. Therefore, it will significantly increase the dielectric constant and dielectric loss of the aerogel structure. Relatively, the lower the content ratio of the acid catalyst induces the slower the overall hydrolysis rate. Therefore, the present invention increases the hydrolysis rate of a trace amount of acid ions by reducing the acid catalyst content and increasing the process temperature, so that the content of acid ions added can be significantly reduced as a whole; on the other hand, siloxane compounds and hydrophobized siloxane compounds will generate a large amount of alcohols molecules (such as methanol and ethanol) during the hydrolysis process. Therefore, organic solvents such as ammonia and alkanes are replaced by the deionized water during the hydrolysis process, thereby reducing the use of ammonia and alkanes. It can not only reduce the impact of organic solvents such as ammonia on the dielectric properties of aerogels, but also reduce the harm of organic solvent treatment in the process, and also reduce the overall aerogel preparation cost.

Further, in the above preparation method, the aqueous solution containing a trace amount of alcohols of the mixed solution includes newly added alcohols such as methanol, ethanol and isopropanol, recovered alcohols such as methanol, ethanol and isopropanol, process recycled water, deionized water, distilled water, double distilled water or a combination thereof.

Further, in the suspension dispersion condensation solution step (2), the siloxane molecules or the hydrophobic siloxane molecules of the hydrolyzed solution are rapidly stirred in an emulsifier or a homogenizer under the prompting of the alkali catalyst aqueous solution and a large amount of dispersion solution, and the hydrolyzed siloxane molecules or hydrophobic siloxane molecules will form a suspension dispersion condensation solution of nano-scale to sub-micron-scale molecules.

Furthermore, in the above suspension dispersion condensation solution step (2), only a large amount of process recycled water, deionized water, distilled water, double distilled water or a combination thereof is added in the preparation method of the aerogel material with low heat transfer provided by the present invention, which includes a trace amount of newly added alcohols such as methanol, ethanol and isopropanol or recovered alcohols such as methanol, ethanol and isopropanol. A large amount of hydrophobic organic solvents, such as toluene and hexane, do not be added and additives such as surfactants do not need to be added in the preparation. By using only hydrolyzed siloxane molecules or hydrophobic siloxane molecules under rapid stirring in an emulsifier or homogenizer, the hydrolyzed siloxane molecules or hydrophobic siloxane molecules will form a suspension dispersion condensation solution of nano-scale to sub-micron-scale molecules. By reducing the particle size of siloxane molecules or hydrophobic siloxane molecules, the specific surface area of the product is rapidly increased, so the drying rate can be rapidly increased during drying period. Therefore, it can avoid the subsequent multiple replacement of hydrophobic organic solvents to reduce the interfacial tension of water molecules, and can prepare aerogel composites with high-purity and low heat transfer.

Further, in the composite molding step (3), the suspension dispersion condensation solution is rapidly sucked into substrates such as a fibrous blanket, a fibrous mat and the like with techniques such as pressure suction, impregnation, and spraying. The hydrolyzed siloxane compounds and hydrophobic siloxane molecules are condensed and aggregated in the substrate to form nano-sized to sub-micron-sized aerogel wet gel aggregates, and then the aerogel wet gel aggregates are aggregated with each other in the substrate to form a three-dimensional network gel microstructure. In the fibrous blanket structure containing wet gel, the solvent content of the hydrolyzed solution containing a trace amount of alcohols is the content of pores in the aerogel particle structure; in addition, the content of a large amount of dispersion aqueous solution containing a trace amount of alcohols added in the condensation reaction is pore content outside the aerogel network in aerogel composites. Therefore, in the present technology, the hydrolysis and condensation reactions can be used to control the aerogel pore structure inside the aerogel composites and the pore content of the aerogel aggregation structure by using a trace amount of aqueous solution containing alcohols that does not contain a hydrophobic organic solvent. In another embodiment, the suspension dispersion condensation solution can also be combined with the continuous fibrous mat or fibrous blanket coiling and spraying process technology by directly using the pressure suction impregnation technology, so that the suspension dispersion condensation solution of the hydrolyzed siloxane molecules and hydrophobic siloxane molecules from nano-scale to sub-micron-scale can be uniformly dispersed inside the fibrous blanket in a continuous coiling process technology. The gelation time of the suspension dispersion condensation solution is controlled by the acid-base concentration ratio, so that the gelation time can be extremely short. During the process, the suspension dispersion condensation solution and the fibrous substrate are combined with each other to form a wet aerogel/fiber blanket structure with a stable appearance, and then the wet aerogel/fiber blanket is further subjected to infrared, ultraviolet, high temperature roller and other drying equipment for coiling and drying.

Further, in the above preparation method, the fibrous blanket, fibrous mat and other substrates includes one or a combination of blanket, cloth or mat whose material is selected from a group consisting of various inorganic fiber, liquid crystal fiber, organic fiber, and a combination thereof. Specifically, the blanket, cloth or mat is made by the material, such as glass fiber, carbon fiber, quartz fiber, ceramic fiber, rock wool fiber, Kevlar polyamide fiber, Nomex polyamide fiber, polyimide fibers such as PI or PEI, nylon fiber, polyester fiber, polyethylene fiber, polypropylene fiber, cellulose fiber, modified cellulose fiber, biosoluble fiber and a combination thereof.

Further, in the above-mentioned composite molding step (3), composite molding such as impregnation, pressure suction, spraying, and spray atomizing can be carried out in combination with the bottom (upper) vacuuming technology. The suspension dispersion condensation solution with the hydrolyzed siloxane molecule and the hydrophobic siloxane molecule can be injected into the fiber-containing substrate at a high speed for composite processing.

Further, the drying and solvent recovery step (4) comprises solvent vaporization drying step and solvent recovery step. In the solvent vaporization drying step, the solid-like wet aerogel/fiber composite blanket forming structure is placed under normal pressure and a co-solvent azeotropic temperature environment of mixed solvent. A large amount of mixed solvent in this kind of solid-like wet aerogel/fiber composite molding structure is rapidly azeotropic vaporized to vaporize and dry the co-solvent, and the vaporization temperature is generally between 60° C. and 110° C. In the bumping step: adjusting the drying temperature of the dry aerogel/fiber composite blanket molding structure to above the bumping temperature of the aqueous solution, so that the remaining moisture in the near-dry aerogel blanket rapidly bumps to form a positive pressure. The shrinkage behavior of the aerogel during the drying process can be suppressed by using the positive pressure between the three-dimensional microstructure of the aerogel. In addition, the positive pressure inside the aerogel microstructure can also be used to promote the generation of a large number of nano-scale to sub-micron-scale fine pores during the expansion process of the aerogel microstructure so as to improve the porosity and thermal insulation properties of the aerogel product. The bumping temperature is 110~180° C.

Further, in the above-mentioned drying step (4), after the solid-like aerogel/fiber composite structure is stabilized, the aqueous solution containing alcohols inside the aerogel wet glue structure is evaporated under the normal pressure environment at the molding and drying temperature. In some embodiments of the present invention, the molding drying step (4) also includes a solvent vaporization step (4-1) and a bumping step (4-2). During the solvent vaporization step (4-1), the alcohols-water solution contained in the solid-like wet aerogel/fiber composite structure is rapidly vaporized and dried at an azeotropic temperature of the co-solvent; in the bumping step (4-2), the temperature of the near-dried aerogel is adjusted to a bumping temperature, so that the aqueous solution containing a trace amount of alcohols in the aerogel is rapidly bumped. At this bumping temperature, the aqueous solution containing a trace amount of alcohols in the aerogel structure generates a positive pressure inside the aerogel, and the positive pressure can inhibit the shrinkage or collapse of the aerogel structure during drying.

Further, in the above-mentioned drying and solvent recovery step (4), when the structure of the solid-like aerogel wet glue is stabilized, under the normal pressure environment and the azeotropic temperature environment of the mixed co-solvent at the molding drying temperature, the large amount of aqueous solution containing alcohols in the molding structure is rapidly azeotropically vaporized and relevant vaporization vapor is directed to a plate heat exchange device. In the plate heat exchange equipment, the aqueous solution containing alcohols is urged to condense and recover; in some embodiments of the present invention, the condensed aqueous solution containing alcohols is an additional recovery product of the process. On the one hand, the purpose of this recovery is to recover valuable alcohols by-products to reduce manufacturing costs; on the other hand, it is to recover alcohol-containing vapors to reduce pollution to the environment and air.

The preparation method provided by the present invention has the following effects:

1. The preparation technology of the invention is to modify the traditional sol-gel reaction process to prepare strong hydrophobic aerogel composites or complex aerogel composites. Because a large amount of hydrophobic organic solvents, surfactants and other substances are not added in the acid hydrolysis and alkali condensation reactions, the manufacturing cost can be significantly reduced. In the subsequent process, there is no need to use long-term solvent replacement or deionized water for water washing or rinsing. Therefore, the overall process is simple, low in cost, and high in process efficiency, so it has obvious economic and competitive advantages.

2. In the preparation technology of the present invention, the aerogel composites with high hydrophobicity or complex different hydrophobicity can be prepared by using different ratios of siloxane compounds and methylsiloxane compounds. And because of the difference in hydrophilicity and hydrophobicity of the surface of the prepared high hydrophobic aerogel composites or the complex aerogel composites, it can provide the field of product application. Therefore, the hydrophobic aerogel composites or the complex aerogel composites prepared by the present technology can be easily combined or mixed with other substrates.

3. In the present invention, it improves the traditional sol-gel synthesis technology and combines the direct suspension dispersion technology, and does not need to add a large amount of organic solvents and surfactants in the preparation. Therefore, aerogel composites with high purity, low cost and low heat transfer coefficient can be prepared without subsequent washing process. The developed product has excellent properties and high temperature resistance. The application temperature range of the developed product can be increased from 200° C. to 1250° C., and it is uneasy to release odors and toxic gases in high temperature applications.

4. The aerogel composites products prepared by the traditional use of pure tetramethylsiloxane, such as tetramethylsiloxane, or hydrophobically modified methylsiloxane, such as monomethyltrimethylsiloxane, in the absence of hydrophobic organic solvents and under normal pressure are generally non-porous amorphous siloxane agglomerates similar to water glass. Although its density is extremely light, its thermal insulation properties at high temperatures cannot be compared to aerogels with a large number of pores.

5. In the present invention, the different proportion of siloxane compound or methylsiloxane compound, the water content of hydrolysis reaction or condensation reaction, the water content of suspension and dispersion, the content of acid catalyst and alkali catalyst, and the suspension and dispersion conditions such as stirring rate can be used to easily control the aerogel microstructure, porosity, pore size and distribution, aerogel particle size and distribution, aerogel surface structure and hydrophilic and hydrophobic properties. The thermal insulation properties of the prepared aerogels can be further regulated to improve the practicality of the aerogels.

6. In the preparation method of the present invention, atmospheric pressure drying technology is used during the solvent drying process, and the drying technology includes azeotropic distillation and bumping of the solvent. Azeotropic distillation drying is to use the two-phase azeotrope principle of mixed solvent to distill the alcohol or water molecules in the wet aerogel suspension colloid at the azeotropic temperature; the bumping step is that the remaining a trace amount of water molecules inside the semi-dried aerogel rapidly bump to form a high positive pressure, which can be used to inhibit the shrinkage of the aerogel on the one hand and promote the generation of a large number of nano-scale to micro-scale pores in the aerogel aggregation structure on the other hand.

7. In the preparation method of the present invention, a large amount of aqueous solution containing alcohols in the molding structure is rapidly azeotropic vaporized during the solvent drying process, and the relevant vaporized vapor is guided to a heat exchange device for solvent recovery. On the one hand, the purpose of recycling is to recover the solvent used in the hydrolysis and condensation reactions; on the other hand, manufacturing costs can be reduced with recovering valuable alcohols by-products; on the other hand, the pollution of the process space environment and harmfulness can be reduced with recovering alcohols.

BRIEF DESCRIPTION OF THE DRA WINGS

DETAILED DESCRIPTION OF THE INVENTION

Figure 1:
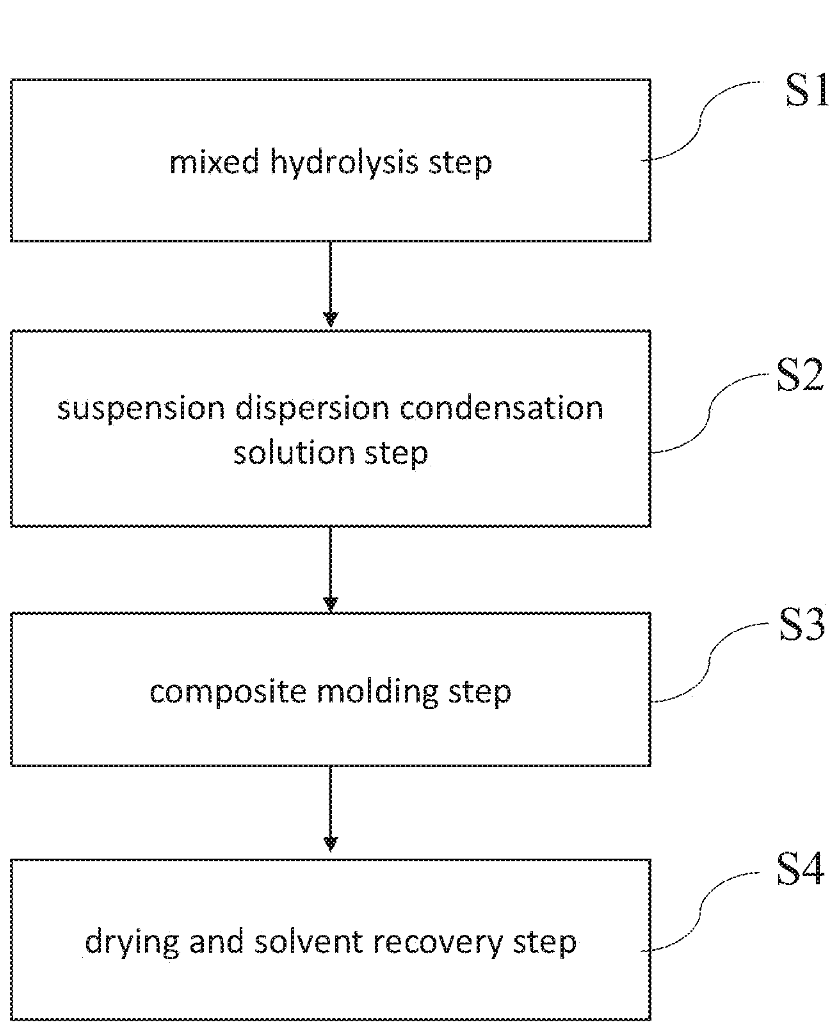
FIG. 1 is a schematic diagram showing the process flow of the low dielectric and low thermal conductivity aerogel composites according to an embodiment of the present invention.

Referring to FIG. 1, the method for preparing a low dielectric and low thermal conductivity aerogel/fiber composites of the present invention is disclosed, which includes the following steps: a mixed hydrolysis step (S1), a suspension dispersion condensation solution step (S2), a composite molding step (S3) and a drying and solvent recovery step (S4).

The mixed hydrolysis step (S1) comprises: mixing a siloxane compound or a methylsiloxane compound with a large amount of an aqueous solution containing alcohols to form a uniform mixed solution, wherein the siloxane compound is selected from a group consisting of tetramethoxysilane (TMOS), tetraethoxysilane (TEOS) and a combination thereof; the methylsiloxane is selected from a group consisting of methyltrimethoxysilane (MTMS), methyltriethoxysilane (MTES) and a combination thereof. The purpose of adding the methylsiloxane compound is to provide strong hydrophobic properties of the complex aerogel composites; the purpose of adding the siloxane compound is to control the internal microstructure of the aerogel system; and the purpose of adding aqueous solution containing alcohols is to provide the porosity content of the aerogel structure. In the overall mixed solution, the volume percent of the total content of the siloxane compound and the methylsiloxane compound is between 2.0 and 40.0, and the volume percent of the aqueous solution containing alcohols is between 98.0 and 60.0, wherein the volume ratio of the siloxane compound and the methylsiloxane compound ranges from 0:100 to 85:15, and the preferred condition in this embodiment is 20:80.

The aqueous solution containing a trace amount of alcohols in the mixed hydrolysis step (S1) is selected from a group consisting of process recycled alcohols, newly added pure alcohols, process recycled water, deionized water, distilled water, double distilled water, anhydrous alcohols and combinations thereof. In the aqueous solution containing a trace amount of alcohols, the molar ratio of alcohols and water ranges from 0:100 to 90:10, and the preferred condition in this embodiment is 25:75.

In the mixed hydrolysis step (S1), the addition of a large amount of deionized water containing a trace amount of acid catalyst will cause a hydrolysis reaction, wherein the molar ratio of the total content of the mixture of the siloxane compound and the methylsiloxane compound to the content of the acid catalyst is 1:0.01 to 1:0.0005. When the content ratio of the acid catalyst in the mixed solution of the siloxane compound and the methylsiloxane compound is higher, the hydrolysis rate will be faster; in addition, when the content of the acid catalyst is lower, it can also be used to increase the hydrolysis rate with rising the temperature of the hydrolyzed solution. In this embodiment, the preferred conditions are that the molar ratio of the total content of the mixture of the siloxane compound and the methylsiloxane compound to the content of the acid catalyst is 1:0.001, and the hydrolysis temperature is 58° C.

In the suspension dispersion condensation solution step (S2), first the alkali catalyst aqueous solutions required for the siloxane compound and the methylsiloxane compound are respectively prepared. When the hydrolysis of the mixed aqueous solution of the siloxane compound and the methylsiloxane compound is completed, a large amount of the dispersion aqueous solution containing alcohols and a trace amount of aqueous alkali catalyst solution are respectively added to the mixed hydrolysis solution of the siloxane compound and the methylsiloxane compound. A dispersing equipment or a stirring device, such as an emulsifier or a homogenizer, is used to rapidly stir to make the mixed hydrolysis solution suspend and disperse in a large amount of dispersing aqueous solutions to form a suspension and dispersion hydrolyzed siloxane/methylsiloxane compounds droplet in water system and perform a condensation reaction in the hydrolyzed siloxane/methylsiloxane compounds droplet, and it carries out a condensation reaction during the suspension and dispersion process. The hydrolyzed solution suspended and dispersed under this condition is dispersed to form nano-scale to micron-scale fine water droplets, and the siloxane compound and the methylsiloxane compound molecules are subjected to condensation reaction in the water droplets. The siloxane compound and the methylsiloxane compound are condensed to form a suspension dispersion condensation solution, and a local network microstructure that is aggregated, condensed and interconnected in nano-scale to micro-scale fine water droplets is formed.

The increase in temperature during this condensation step helps significantly shorten the condensation reaction time (i.e. the gelation time of the aerogel). When the content weight ratio of the alkali catalyst to the acid catalyst is 0.85:1.0, the condensation reaction temperature at room temperature is about 30° C. and the gelation time is about 126 minutes. The condensation reaction temperature is 50° C. and the gelation time is about 20 minutes. In the condensation reaction, the molar ratio of the alkali catalyst to the acid catalyst is 0.7:1 to 1.8:1. In addition, in the mixed solution of alkali catalyst and water, the increase of alkali catalyst content will also significantly shorten the condensation reaction time. In addition, increasing the temperature of the hydrolysis and condensation reactions also helps improve the reaction rates of the hydrolysis and condensation. When the content volume ratio of 1M alkali catalyst and 1M acid catalyst is 0.8:1.0, the gelation time is about 360 minutes, but the dielectric loss of the aerogel will decrease. When the content ratio of 1M alkali catalyst and 1M acid catalyst is 1.2:1.0, the gelation time is reduced to about 20 minutes, so the temperature and the content ratio of 1M alkali catalyst and 1M acid catalyst can be used to control the time of the condensation step.

In the suspension dispersion condensation solution step (S2), the mixed hydrolysis solution comprising the siloxane compound and the methylsiloxane compound is added with a large amount of dispersion aqueous solution, which comprises a large amount of process recycled water, deionized water, process recycled aqueous solution containing alcohols, distilled water, double distilled water and a trace amount of newly added alcohols, process recycled alcohol or its combination. In the dispersion aqueous solution, the molar ratio of the alcohols and water ranges from 0:100 to 90:10, and the preferred condition in this embodiment is 25:75.

In the suspension dispersion condensation solution step (S2), when the siloxane compound and the methylsiloxane compound are mixed in the hydrolysis solution for condensation reaction, the siloxane compound condensation solution can be mixed with the methylsiloxane compound condensation solution in a volume ratio from 0:100 to 90:10 and stirred to form a uniform mixed condensation solution. The condensation solution mixing step can be divided into multiple mixing steps such as one-stage mixing or two-stage mixing. The molar ratio of the siloxane compound and the methylsiloxane compound and the conditions of the first-stage mixing and the second-stage mixing of the condensation solution utilized in this mixing step can control the microstructure of aerogel product.

In the suspension dispersion condensation solution step (S2), when the condensation solution of the siloxane compound and the methylsiloxane compound is mixed to continue undergoing the condensation reaction, a dispersing equipment such as an emulsifier, a homogenizer or a vortex mixer can be used to make the mixed condensation solution in a suitable dispersion aqueous solution, such as a dispersing aqueous solution containing the hydrolyzed siloxane and methylsiloxane compounds, be rapidly suspended and dispersed to form a wet suspension dispersion condensation solution, so that the developed condensation solution of siloxane compound and methylsiloxane compound is dispersed to form a wet suspension dispersion condensation solution with a particle size of about several nanometers to several thousand micrometers. At this stage, the local network microstructure aggregated by the siloxane compound in the siloxane compound condensation solution and the local network microstructure aggregated by methylsiloxane compounds in the methylsiloxane compound condensation solution will be further interconnected to each other to form a three-dimensional network microstructure. Therefore, the microstructure, particle size, and particle size distribution of the developed and prepared aerogels are mainly regulated in this suspension and dispersion step.

In the composite molding step (S3), the suspension dispersion condensation solution is formed to perform pressure suction, impregnation, and spraying techniques with various types of fibrous blankets, fibrous cloths, and fibrous mats. For example, the suspension dispersion condensation solution is subjected to pressure suction impregnation technology under vacuum conditions so as to promote the rapid inhalation of the suspension dispersion condensation solution into a fibrous substrate. Therefore, the hydrolyzed siloxane compounds and hydrophobic siloxane molecules are condensed and aggregated in the fibrous blanket to form a nano-size to sub-micron size aerogel aggregation structure, and then aggregation of the hydrolyzed siloxane and methylsiloxane compounds in the fibrous matrix to form a three-dimensional network gel microstructure so as to form a wet aerogel/fiber composites. In this aerogel/fiber composite substrate structure, the content of the aqueous solution containing alcohols in the hydrolysis solution is the content of pores in the aerogel aggregated structure. In addition, the content of a large amount of dispersion aqueous solution added in the condensation reaction is the content of pores between or outside the aerogel network structure in the aerogel/fiber composite substrate structure. Therefore, the aerogel structure inside the aerogel composites and the pores in the aerogel/fiber composite substrate structure can be controlled by adding the content of an aqueous solution containing no hydrophobic organic solvent and only a trace amount of alcohols in the hydrolysis and condensation reactions content in this technique. In another embodiment, the suspension dispersion sol solution can also be directly combined with continuous process technology by pressure suction impregnation technology to make the nano-scale to sub-micron-scale hydrolyzed siloxane molecules and hydrophobic siloxane suspension dispersion condensation solution inject into a continuous fibrous blanket and control the gelation time to promote the combination of the sol solution and the fibrous material in a very short time so as to form a wet aerogel blanket structure with a stable appearance, and then the wet aerogel blanket structure is coiled or cut to length and dry.

In the composite molding step (S3), the fibrous substrate comprises blanket, cloth or mat, which is selected from a group consisting of inorganic fibers, liquid crystal fibers, organic fibers, specifically, such as glass fibers, carbon fibers, quartz fibers, ceramic fibers, rock wool fibers, Kevlar polyamide fibers, Nomex polyimide fiber, PI polyimide fiber, nylon fiber, polyester fiber, polyethylene fiber, polypropylene fiber, cellulose fiber, and modified cellulose fiber, bio-soluble fiber or a combination thereof.

In the composite molding step (S3), the bottom (or upper) vacuuming device can be combined with technologies such as impregnation, pressure suction, shower spray, and atomizer, and the suspension dispersion condensation solution can be injected into the fiber-containing substrate at a high speed for composite molding.

In the drying and solvent recovery step (S4), when the suspension aerogel colloid in the aerogel/fiber composite substrate structure is stabilized, a solvent recovery drying step is performed, which comprises a co-solvent azeotropic vaporization step and a solvent bumping step. In the co-solvent azeotropic vaporization step, the aerogel system is firstly placed in a drying equipment with a high temperature, such as between 70 and 115 □, so that a large amount of aqueous solution containing alcohols in the wet aerogel system will produce co-solvent azeotropic evaporation at high temperature, and quickly azeotropically distill the alcohols-water co-solvent molecules out and recycle them for reused, dried to form a semi-dry aerogel in the aerogel/fiber composite substrate. Then, the solvent bumping step is carried out at a higher temperature, and the temperature of the semi-dry aerogel particle system is raised to a high temperature environment of 120 to 150 □, so that a trace amount of co-solvent contained in the aerogel/fiber composite substrate is rapidly bumped to form a dried aerogel/fiber composites by rapid evaporation. A high positive pressure is generated inside the aerogel by utilizing the rapid bumping phenomenon of the co-solvent inside the aerogel, and the phenomenon of shrinking the aerogel during the drying process is suppressed by using this positive pressure. On the other hand, the positive pressure is used to promote the generation of a large number of nano-scale to micro-scale pores in the aerogel/fiber composite substrate and make the aerogel porous. Therefore, a low density and high porosity high thermal insulation aerogel/fiber composite substrate can be prepared.

Figure 2:
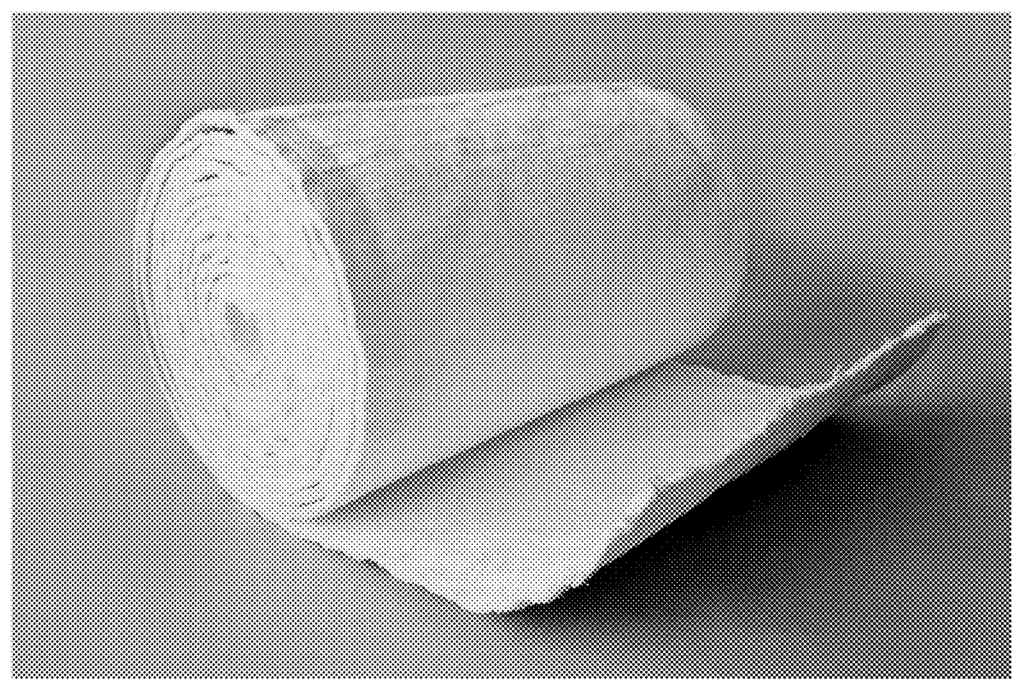
FIG. 2 is a photograph of the appearance of the low dielectric and low thermal conductivity aerogel/glass fiber blanket prepared in the first embodiment of the present invention.
Figure 3:
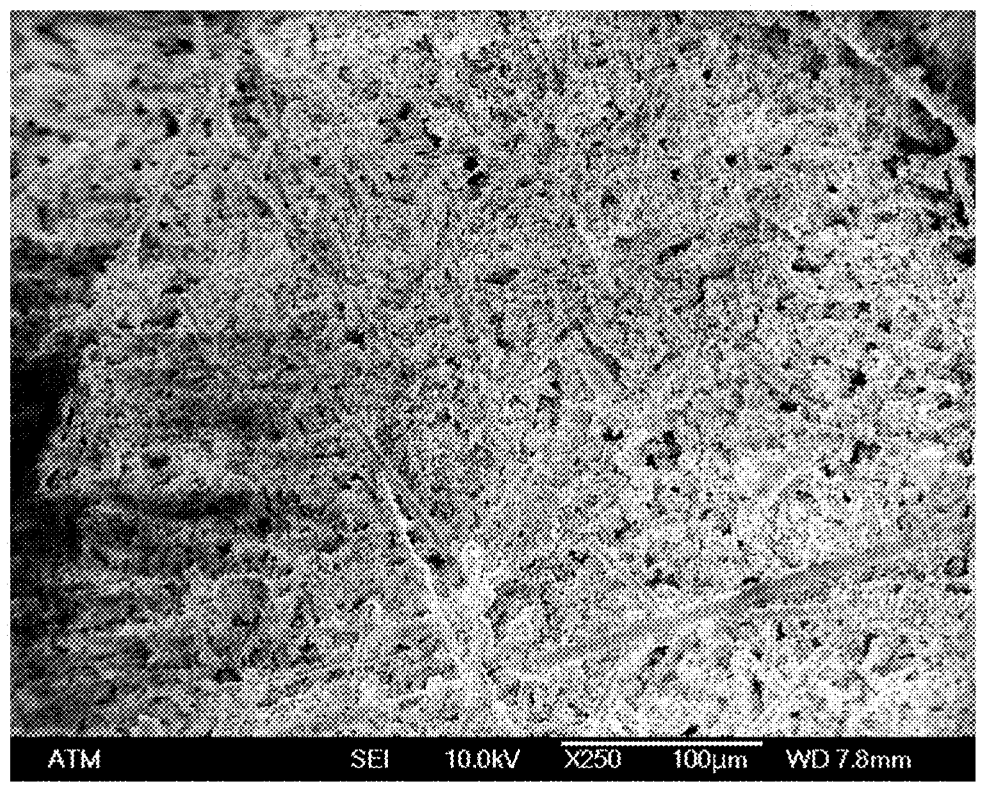
FIG. 3 is a scanning electron microscope micrograph of the low dielectric and low thermal conductivity aerogel/glass fiber blanket prepared in the first embodiment of the present invention, and the magnification is 250 times.
Figure 4:
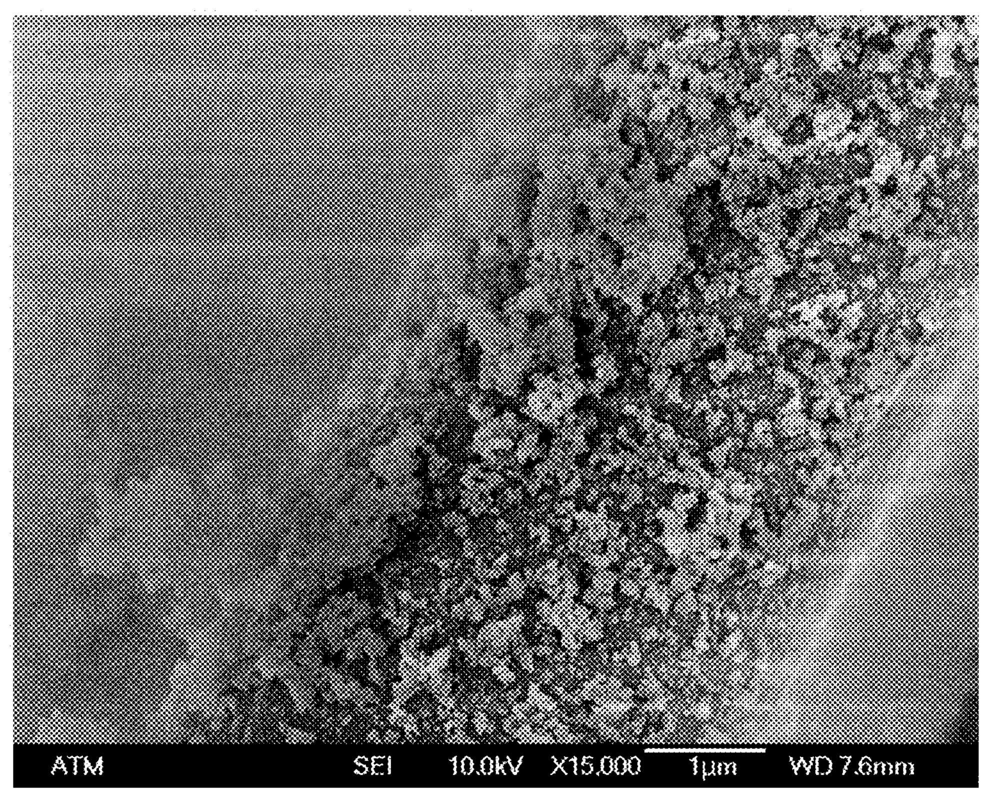
FIG. 4 is a scanning electron microscope micrograph of the low dielectric and low thermal conductivity aerogel/glass fiber blanket prepared in the first embodiment of the present invention, and the magnification is 15,000 times.

In addition, since a large amount of hydrophobic organic solvents such as alkanes, aromatic benzenes, and halogenated alkanes are not added, the drying process is relatively safe, and there is no need to use fractionation and other equipment to recover various solvents in the preparation of recovered solvents to reduce recovery costs. And because there are no added surfactants, ammonia and other substances, a higher purity aerogel product can be prepared. Because the prepared high-porosity aerogel composites do not contain various impurities, the thermal conductivity, dielectric constant and dielectric loss of the product will be better. Please refer to FIG. 2, which is a photograph of the appearance of the aerogel/glass fiber blanket with high purity, low cost, and low thermal conductivity prepared by the aforementioned preparation method of the first embodiment. The appearance of the low dielectric and low thermal conductivity aerogel/glass fiber blanket prepared by this technology is a white blanket-like appearance, indicating that the prepared product has no impurities such as other metal oxides. Please refer to FIG. 3, which shows a scanning electron microscope microscopic observation photo of a partial magnification of 250 times of the low dielectric and low thermal conductivity aerogel/glass fiber blanket prepared by the aforementioned preparation method of the first embodiment, and the photo shows the filling and structural appearance of the aerogel between the glass fiber tissue structures inside the aerogel/glass fiber blanket. Further, please refer to FIG. 4, which shows the scanning electron microscope microscopic observation photo of the low dielectric and low thermal conductivity aerogel/glass fiber blanket prepared by the present technology at a magnification of 15,000 times. The photo shows that the aerogel and the glass fiber present a tightly bound structure, and the size of the aerogel on the surface of the glass fiber is about tens to about one hundred nanometers and it is coated on the outside of the glass fiber in a uniform spherical structure. It can be seen from FIG. 4 that there are a large number of fine pores in the aerogel agglomeration structure.

In the drying and solvent recovery step (S4), drying the solid-like aerogel wet glue structure with a high temperature under a normal pressure at a molding drying temperature is to obtain a uniform structure with low heat transfer gel preformed composite; in some embodiments, the drying temperature is between 60 and 150° C.

Further, the drying step includes a solvent vaporization step (S4-1) and a solvent bumping step (S4-2).

In the solvent vaporization step (S4-1), the preformed aerogel wet glue system is placed in an environment with a solvent vaporization temperature, and at the same time the preformed aerogel wet glue system is made to be in a normal pressure state. The temperature is used to rapidly azeotropic vaporize a large amount of alcohols and water co-solvent molecules to azeotropically distill and dry the alcohols and water co-solvent molecules in the aerogel wet gel system; in some embodiments, the vaporization temperature is 60-110° C.

In the solvent bumping step (S4-2), the ambient temperature of the vaporized preformed aerogel containing a trace amount of solvent is adjusted to the solvent bumping temperature, so that the trace amount of solvent contained in the inside produces a rapid vaporization bumping phenomenon; in some embodiments, the bumping temperature is 110~150° C.; it should be further explained that the bumping phenomenon produced by the trace amount of alcohols and water molecules inside the aerogel promotes a positive pressure inside the aerogel under the high temperature environment created by the bumping temperature, and the positive pressure can inhibit the shrinkage or collapse of aerogel structures during drying. On the other hand, the positive pressure makes the aerogel network microstructure swell to generate porosity; therefore, the preparation method can be used to prepare low-density and high-porosity aerogels or aerogel/fiber composites, and its thermal conductivity k is about 0.023~0.038W/mk.

In the drying and solvent recovery step (S4), when the structure of the solid-like aerogel wet glue is stabilized, under the normal pressure environment and the azeotropic temperature environment of the mixed co-solvent at the molding drying temperature, the large amount of aqueous solution containing alcohols in the molding structure is rapidly azeotropic vaporized and relevant vaporization co-solvent vapor is directed to a plate heat exchange device. In the plate heat exchange equipment, the aqueous solution containing alcohols is urged to condense and recover for reuse; in some embodiments of the present invention, the aqueous solution containing alcohols in the condensation recovery is the raw material used for hydrolysis and suspension dispersion in this process, so the usage amount of the raw material can be reduced to reduce the product manufacturing cost. On the other hand, the purpose of the recovery is to recover valuable alcohols by-products to increase product income, and another purpose of recovering the aqueous solution containing alcohols is to reduce the pollution and harm of the alcohols solvent to the environment and air during the process.

Figure 5:
FIG. 5 is a photograph of the appearance of the low dielectric and low thermal conductivity aerogel/ceramic fiber blanket prepared by the second embodiment of the present invention.
Figure 6:
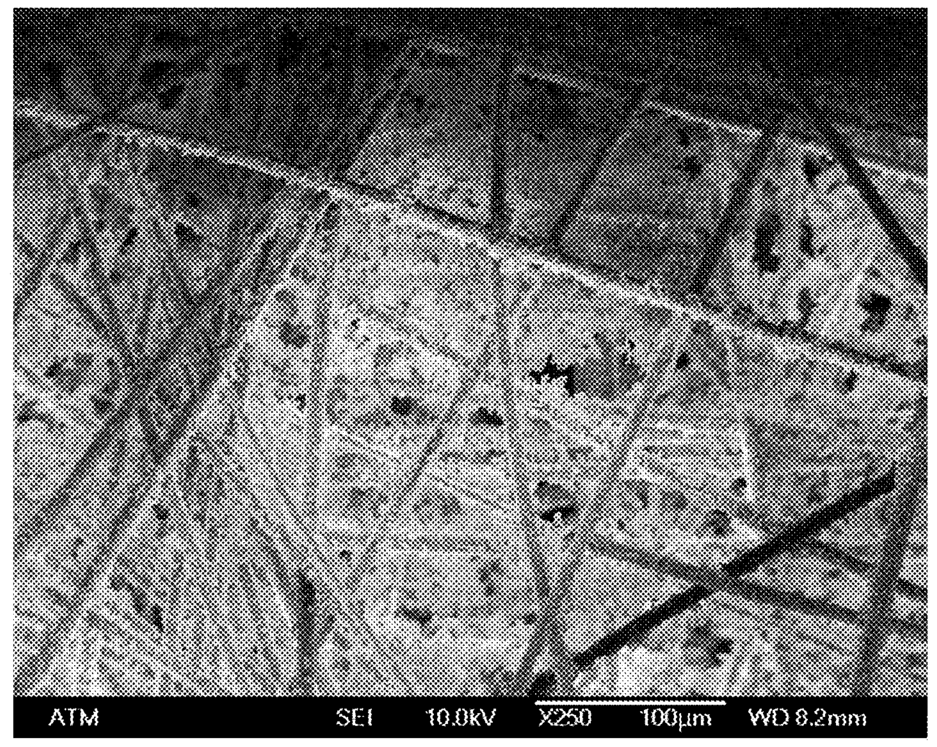
FIG. 6 is an electron microscope micrograph of the low dielectric and low thermal conductivity aerogel/ceramic fiber blanket prepared by the second embodiment of the present invention, and the magnification is 250 times.
Figure 7:
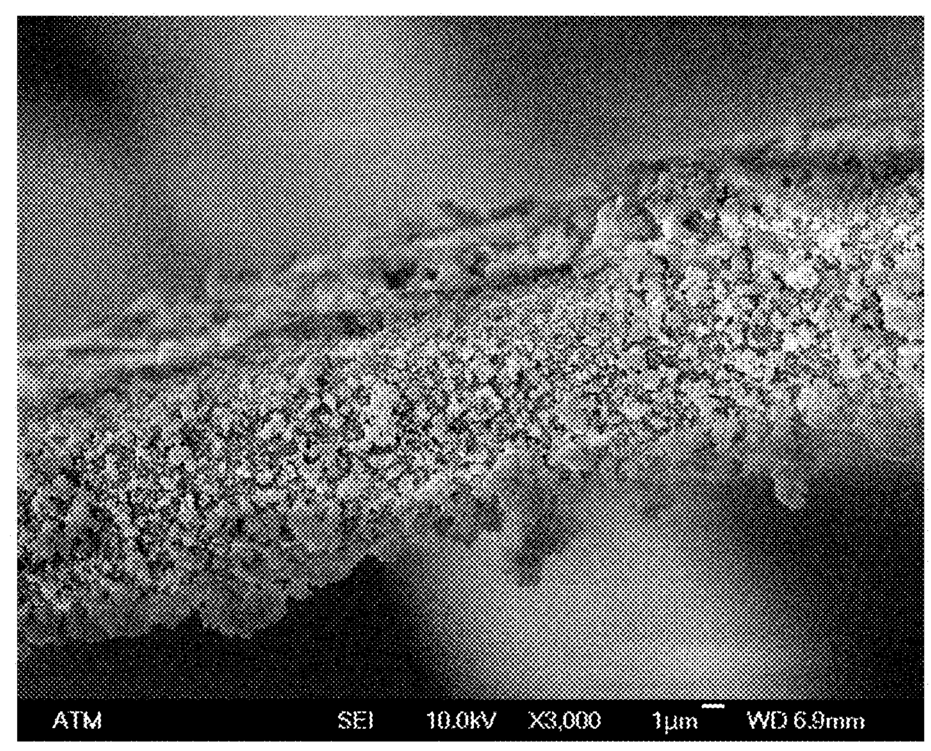
FIG. 7 is an electron microscope micrograph of the low dielectric and low thermal conductivity aerogel/ceramic fiber blanket prepared by the second embodiment of the present invention, and the magnification is 3,000 times.

Please refer to FIG. 5, which shows the appearance photo of the aerogel/ceramic fiber blanket with both low dielectric and low thermal conductivity prepared by the aforementioned preparation method of the second embodiment. The appearance of the aerogel/ceramic fiber blanket with both low dielectric and low thermal conductivity prepared by this technology is a gray-white thermal insulation blanket-like appearance, and the gray-white thermal insulation blanket represents the appearance color displayed by the ceramic fiber. Further, please refer to FIG. 6, which shows a scanning electron microscope microscopic observation photo with a partial magnification of 250 times of the low dielectric and low thermal conductivity aerogel/ceramic fiber blanket prepared by the aforementioned preparation method of the second embodiment of the present technology. The filling and structural appearance of the aerogel between the fibrous tissue structures inside the aerogel/ceramic fiber blanket are shown in the photo. Further, please refer to FIG. 7, which shows a scanning electron microscope microscopic observation photo of a partial magnification of 3,000 times of the low dielectric and low thermal conductivity aerogel/ceramic fiber blanket prepared by the aforementioned preparation method of the second embodiment of the present technology. The photo also shows that the aerogel and the ceramic fiber present a tightly combined structure, and the size of the aerogel on the surface of the ceramic fiber is also about tens to about 100 nanometers. The uniform spherical structure is coated on the outside of the glass fiber, and it can be seen from FIG. 7 that there are a lot of fine pores between the aerogel agglomeration structures.

Figure 8:
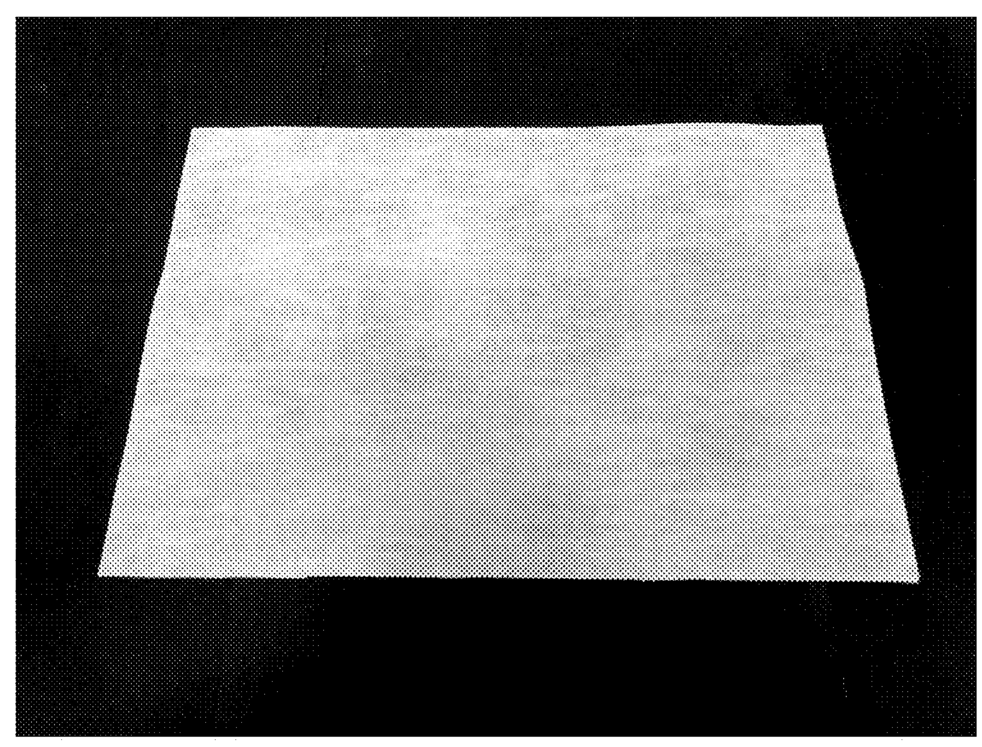
FIG. 8 is a photograph of the appearance of the low dielectric and low thermal conductivity aerogel/non-woven fiber mat prepared by the third embodiment of the present invention.
Figure 9:
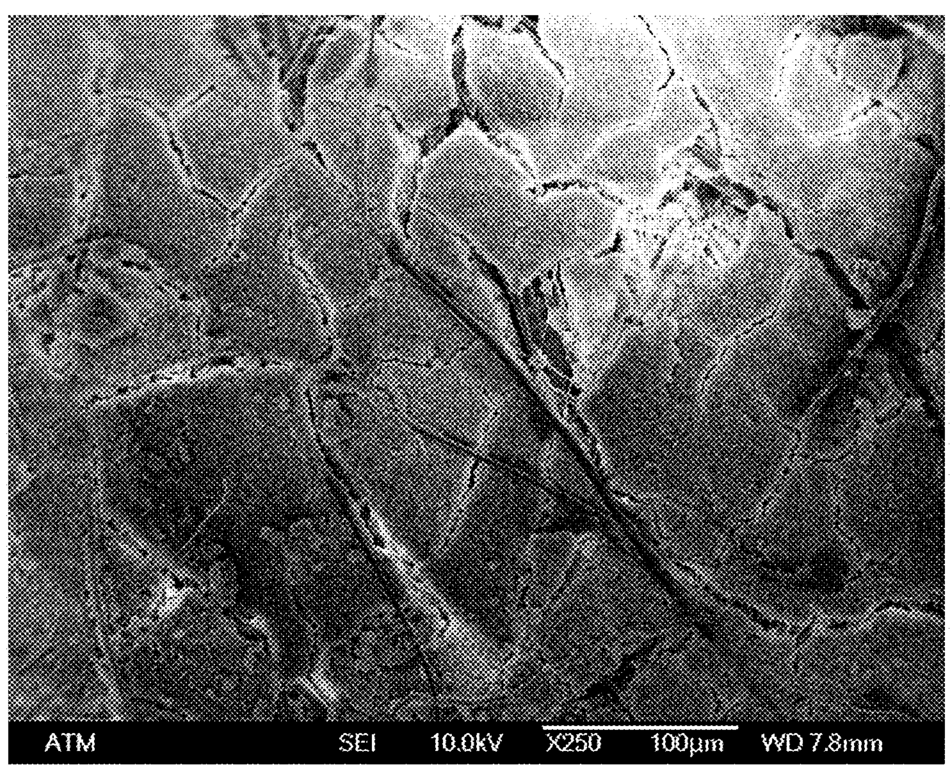
FIG. 9 is an electron microscope micrograph of the low dielectric and low thermal conductivity aerogel/non-woven fiber mat prepared by the third embodiment of the present invention, and the magnification is 250 times.
Figure 10:
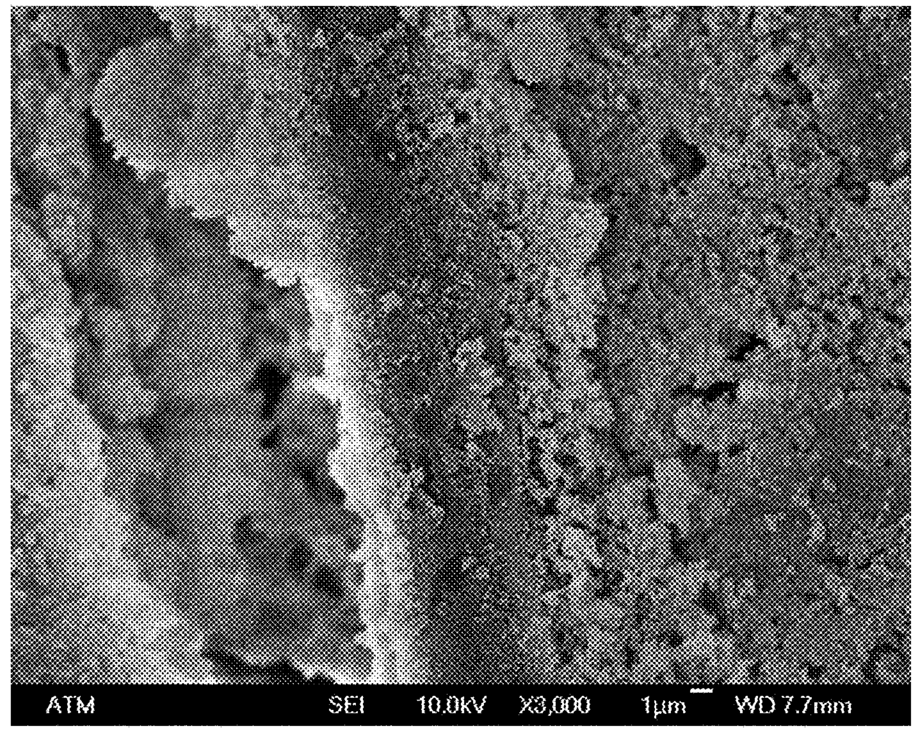
FIG. 10 is an electron microscope micrograph of the low dielectric and low thermal conductivity aerogel/non-woven fiber mat prepared by the third embodiment of the present invention, and the magnification is 3,000 times.

Please refer to FIG. 8, which is a photograph of the appearance of the aerogel/non-woven fiber mat with high purity, low cost, and low thermal conductivity prepared by the aforementioned preparation method of the third embodiment. FIG. 8 shows the aerogel/non-woven fiber mat. The fibrous mat is a product with a thickness of about 100 microns to 200 microns, and depends on the formulation of the aerogel, so the appearance of the aerogel/non-woven fibrous mat is white and transparent. Further, please refer to FIG. 9, which shows a scanning electron microscope microscopic observation photo of the aerogel/non-woven fiber mat prepared by the aforementioned preparation method of the third embodiment of the present technology, with a magnification of 250 times. The photo shows the filling form of the aerogel between the non-woven fibrous structures inside the aerogel/non-woven fibrous mat. Further, please refer to FIG. 10, which shows a scanning electron microscope microscopic observation photo of the aerogel/non-woven fiber mat prepared by the aforementioned preparation method of the third embodiment of the present technology at a magnification of 3,000 times. The photos also show that the size of the aerogel between the non-woven structures is also between about tens to about one hundred nanometers. The uniform spherical structures are stacked between the non-woven fibers, and it can be seen that there are a lot of fine pores between the aerogel agglomerated structures to provide the thermal insulation effect of the aerogel/non-woven fiber mat.

The density of the hydrophobic or hydrophobic-hydrophilic complex aerogel/fiber composites produced by this technology is between about 0.25 and 0.45 g/cm$^3$. Since there are no other impurities in the process, the thermal conductivity is significantly reduced. The thermal conductivity of the hydrophobic aerogel/fiber composite is between about 0.019 and 0.032 W/mk.

It is to be understood that the foregoing descriptions of the embodiments are given by way of example only, and various modifications may be made by those skilled in the art to which this field pertains. The above specification and examples provide a complete description of the flow of exemplary embodiments of the invention and their uses. Although the above embodiments disclose specific embodiments of the present invention, they are not intended to limit the present invention. Those with ordinary knowledge in the technical field to which the present invention pertains, without departing from the principle and spirit of the present invention, can make various changes and modifications to it, so the protection scope of the present invention should be defined by the appended claims.

What is claimed is:

1. A method for preparing a low-dielectric and low-thermal conductivity aerogel/fiber composites, comprising:

a mixed hydrolysis step: respectively mixing a siloxane compound, a methylsiloxane compound or a combination thereof with a large amount of an aqueous solution containing a trace amount of alcohols to form a mixed solution, and adding a catalyst containing a trace amount of acid under stirring to make the mixed solution undergo a hydrolysis reaction;

a suspension dispersion condensation solution step: respectively adding a large amount of a dispersion aqueous solution containing alcohols and a trace amount of alkali catalyst aqueous solution in the mixed solution, and using a stirring device comprising an emulsifier or a homogenizer to rapidly suspend and disperse the mixed solution into a suspension and dispersion hydrolyzed siloxane/methylsiloxane compounds droplet in water system and perform a condensation reaction in the hydrolyzed siloxane/methylsiloxane compounds droplet to make the siloxane compound and the methylsiloxane compound condense to form a suspension dispersion condensation solution when the hydrolysis of the mixed solution of the hydrolyzed siloxane compound and the methylsiloxane compound is completed;

a composite molding step: performing a pressure suction impregnation technology for the suspension dispersion condensation solution under vacuum conditions so as to promote the suspension dispersion condensation solution rapidly sucked into a fibrous substrate so that the condensation and aggregation of the hydrolyzed siloxane compounds and hydrophobic siloxane molecules are carried out in the fibrous substrate to form nano- sized to sub-micron-sized aerogel wet gel aggregates, which are then aggregated with each other in the fibrous substrate to form a three-dimensional network gel microstructure so as to form a wet aerogel/fiber composite material; and a drying and solvent recovery step: placing the wet aerogel/fiber composite material in a drying equipment with temperature range from 70° C. to 115° C. so that a large amount of the aqueous solution containing alcohols in the wet aerogel system is azeotropically evaporated so as to make the aqueous solution containing alcohols be quickly distilled out and recycled in a high temperature environment, and then placing the aerogel/fiber composite material in the higher temperature range from 120° C. to 150° C. so as to form a dried aerogel/fiber composites by rapid evaporation.

2. The method as claimed in claim 1, wherein the siloxane compound is tetramethoxysilane (TMOS) or tetraethoxysilane (TEOS), and the methylsiloxane compound is methyltrimethoxysilane (MTMS) or methyltriethoxysilane (MTES); the mixed solution comprises 2 to 40% the siloxane compound and the methylsiloxane compound; the mixed solution comprises 98 to 60% the aqueous solution containing alcohols.

3. The method as claimed in claim 1, wherein the siloxane compound is tetramethoxysilane (TMOS) or tetraethoxysilane (TEOS), and the methylsiloxane compound is methyltrimethoxysilane (MTMS) or methyltriethoxysilane (MTES); the volume ratio of the siloxane compound to the methylsiloxane compound is from 0:100 to 85:15.

4. The method as claimed in claim 1, wherein the aqueous solution containing alcohols in the mixed hydrolysis step is selected from a group consisting of process recycled water, process recycled aqueous solution containing alcohols, process recycled distilled water, double distilled water, deionized water, process recycled alcohols, pure alcohols and a combination thereof.

5. The method as claimed in claim 1, wherein the molar ratio of the total content of the mixture of the siloxane compound and the methylsiloxane compound to the content of the acid catalyst is 1:0.01 to 1:0.0005, and the molar ratio of the alkali catalyst to the acid catalyst is 0.7:1 to 1.8:1 in the condensation reaction.

6. The method as claimed in claim 1, wherein in the suspension dispersion condensation solution step, using dispersing equipment comprising an emulsifier, a homogenizer or a vortex mixer makes the condensation solution rapidly suspend and disperse in a suitable dispersion aqueous solution containing the hydrolyzed siloxane and methylsiloxane compounds so as to form a wet suspension dispersion condensation solution with a particle size ranging from several nanometers to several thousand micrometers when the hydrolyzed siloxane and methylsiloxane compounds undergo condensation reaction.

7. The method as claimed in claim 1, wherein the dispersion aqueous solution containing the hydrolyzed siloxane and methylsiloxane compounds in the suspension dispersion condensation solution step is selected from a group consisting of process recycled water, process recycled aqueous solution containing alcohols, process recycled distilled water, double distilled water, deionized water, process recycled alcohols, pure alcohols and a combination thereof.

8. The method as claimed in claim 1, wherein the composite molding step comprises the suspension dispersion condensation solution rapidly sucked into a fibrous substrate by performing pressure suction, impregnation or spray technology, and then aggregation of the hydrolyzed siloxane and methylsiloxane compounds in the fibrous blanket to form a three-dimensional network aerogel/fiber composite microstructure, wherein the fibrous substrate comprises a blanket, a cloth or a mat which is selected from a group consisting of inorganic fiber, liquid-crystal fiber, and organic fiber, which is selected from a group consisting of glass fiber, carbon fiber, quartz fiber, ceramic fiber, rock wool fiber, polyimide fiber, nylon fiber, polyester fiber, polyethylene fiber, polypropylene fiber, cellulose fibers, modified cellulose fiber, bio-soluble fiber and a combination thereof.

9. The method as claimed in claim 1, wherein the drying and solvent recovery step is performed after the suspension wet aerogel colloid in the aerogel/fiber composite substrate structure is stabilized, which comprises a co-solvent azeotropic vaporization step and a solvent bumping step; the co-solvent azeotropic vaporization step comprises that the aerogel system is first azeotropically evaporated by azeotropic evaporation of a large amount of aqueous solution containing alcohols at high temperature and the alcohols-water co-solvent molecules are rapidly azeotropically distilled into a semi-dry aerogel in the aerogel/fiber composite substrate; and then the solvent bumping step is performed at a higher temperature so that the trace amount of co-solvent contained in the aerogel/fiber composite substrate produces a rapid bumping phenomenon and inhibits the shrinkage of the aerogel during the dry process.

10. The method as claimed in claim 1, wherein the microstructure, porosity, pore size and distribution, particle size and distribution of a developed and prepared aerogel of the dried aerogel/fiber composites are controlled by using the sol-gel reaction improvement technology, which comprises using the content of the mixture of siloxane and methylsiloxane, the content of the hydrolysis solution containing a trace amount of acid catalyst, the content of the dispersion aqueous solution containing a trace amount of alkali catalyst, the mixing ratio and steps of the condensation solution, the high-speed suspension dispersion stirring rate and specific drying temperature.

11. The method as claimed in claim 2, wherein the siloxane compound is tetramethoxysilane (TMOS) or tetraethoxysilane (TEOS), and the methylsiloxane compound is methyltrimethoxysilane (MTMS) or methyltriethoxysilane (MTES).

12. The method as claimed in claim 2, wherein the volume ratio of the siloxane compound to the methylsiloxane compound is from 0:100 to 85:15.

13. The method as claimed in claim 2, wherein the alcohols aqueous solution in the mixed hydrolysis step is selected from a group consisting of process recycled water, process recycled aqueous solution containing alcohols, process recycled distilled water, double distilled water, deionized water, process recycled alcohols, pure alcohols and a combination thereof.

14. The method as claimed in claim 2, wherein the molar ratio of the total content of the mixture of the siloxane compound and the methylsiloxane compound to the content of the acid catalyst is 1:0.01 to 1:0.0005.

15. The method as claimed in claim 2, wherein the molar ratio of the alkali catalyst to the acid catalyst is 0.7:1 to 1.8:1 in the condensation reaction.

16. The method as claimed in claim 2, wherein in the suspension dispersion condensation solution step, using dispersing equipment comprising an emulsifier, a homogenizer or a vortex mixer makes the condensation solution rapidly suspend and disperse in a suitable dispersion aqueous solution containing the hydrolyzed siloxane and methylsiloxane compounds so as to form a wet suspension dispersion condensation solution with a particle size ranging from several nanometers to several thousand micrometers when the mixed solution of the hydrolyzed siloxane and methylsiloxane compounds undergo condensation reaction.

17. The method as claimed in claim 2, wherein in the suspension dispersion condensation solution step, the dispersion aqueous solution containing the hydrolyzed siloxane and methylsiloxane compounds in the suspension dispersion condensation solution step is selected from a group consisting of process recycled water, process recycled aqueous solution containing alcohols, process recycled distilled water, double distilled water, deionized water, process recycled alcohols, pure alcohols and a combination thereof.

18. The method as claimed in claim 2, wherein the composite molding step comprises the suspension dispersion condensation solution rapidly sucked into a fibrous substrate by performing pressure suction, impregnation or spray technology, and then aggregation of the hydrolyzed siloxane and methylsiloxane compounds in the fibrous blanket to form a three-dimensional network aerogel/fiber composite structure, wherein the fibrous substrate comprises a blanket, a cloth or a mat which is selected from a group consisting of inorganic fiber, liquid-crystal fiber, and organic fiber, which is selected from a group consisting of glass fiber, carbon fiber, quartz fiber, ceramic fiber, rock wool fiber, polyimide fiber, nylon fiber, polyester fiber, polyethylene fiber, polypropylene fiber, cellulose fiber, modified cellulose fiber, bio-soluble fiber and a combination thereof.

19. The method as claimed in claim 2, wherein the drying and solvent recovery step is performed when the suspension aerogel colloid in the aerogel/fiber composite substrate structure is stabilized, which comprises a co-solvent azeotropic vaporization step and a solvent bumping step; the co-solvent azeotropic vaporization step comprises that the aerogel system is first azeotropically evaporated by azeotropic evaporation of a large amount of aqueous solution containing alcohols at high temperature and the alcohols-water co-solvent molecules are rapidly azeotropically distilled into a semi-dry aerogel in the aerogel/fiber composite substrate; and then the solvent bumping step is performed at a higher temperature so that the trace amount of co-solvent contained in the aerogel/fiber composite substrate produces a rapid bumping phenomenon and inhibits the shrinkage of the aerogel during the dry process.

20. The method as claimed in claim 2, wherein the microstructure, porosity, pore size and distribution, particle size and distribution a developed and prepared aerogel of the dried aerogel/fiber composites are controlled by using the sol-gel reaction improvement technology, which comprises using the content of the mixture of siloxane and methylsiloxane, the content of the hydrolysis solution containing a trace amount of acid catalyst, the content of the dispersion aqueous solution containing a trace amount of alkali catalyst, the mixing ratio and steps of the condensation solution, the high-speed suspension dispersion stirring rate and specific drying temperature.

* * * * *